US008634469B2

(12) United States Patent
Lu et al.

(10) Patent No.: US 8,634,469 B2
(45) Date of Patent: Jan. 21, 2014

(54) METHOD AND APPARATUS FOR REUSING AVAILABLE MOTION INFORMATION AS A MOTION ESTIMATION PREDICTOR FOR VIDEO ENCODING

(75) Inventors: Xiaoan Lu, Princeton, NJ (US); Alexandros Tourapis, Burbank, CA (US); Jill MacDonald Boyce, Manalapan, NJ (US); Peng Yin, West Windsor, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 1244 days.

(21) Appl. No.: 12/087,915

(22) PCT Filed: Feb. 1, 2007

(86) PCT No.: PCT/US2007/002772
§ 371 (c)(1),
(2), (4) Date: Nov. 4, 2008

(87) PCT Pub. No.: WO2007/092255
PCT Pub. Date: Aug. 16, 2007

(65) Prior Publication Data
US 2009/0168884 A1 Jul. 2, 2009

Related U.S. Application Data

(60) Provisional application No. 60/765,553, filed on Feb. 6, 2006.

(51) Int. Cl.
*H04N 11/02* (2006.01)
*H04B 1/66* (2006.01)
*H04N 7/12* (2006.01)
*H04N 11/04* (2006.01)
*H04N 5/14* (2006.01)

(52) U.S. Cl.
USPC .......... 375/240.16; 375/240; 375/240.01; 375/240.04; 375/240.12; 375/240.13; 375/240.22; 348/699

(58) Field of Classification Search
None
See application file for complete search history.

(56) References Cited

U.S. PATENT DOCUMENTS 5,796,434 A * 8/1998 Lempel ............... 348/403.1
6,289,052 B1 * 9/2001 Faryar et al. ......... 375/240.16
(Continued)

FOREIGN PATENT DOCUMENTS

EP 0811951 12/1997

OTHER PUBLICATIONS

Lu et al: "Fast Mode Decision and Motion Estimation for H.264 with a Focus on MPEG-2/H.264 Transcoding", Circuits and Systems, ISCAS 2005, IEEE International Symposium in Kobe, Japan, May 23-26, 2005, Piscataway, N J, USA, IEEE, pp. 1246-1249, XP010815936.*

(Continued)

*Primary Examiner* — Nathan Flynn
*Assistant Examiner* — Trang Doan
(74) *Attorney, Agent, or Firm* — Robert D. Shedd; Guy H. Eriksen

(57) ABSTRACT

There are provided a method and apparatus for reusing available motion information as a motion estimation predictor for video encoding. The apparatus includes an encoder for encoding an image block by determining a motion estimation predictor for the image block using motion information previously generated from an element other than the encoder, and using the motion estimation predictor in a motion estimation process to generate a motion vector for the image block. The motion estimation predictor is used in place of at least one predictor otherwise used in the motion estimation process. The at least one predictor is any of a search window predictor, a temporal predictor, and a block type predictor.

30 Claims, 6 Drawing Sheets

(56) References Cited

U.S. PATENT DOCUMENTS

| | | | | |
|---|---|---|---|---|
| 6,650,707 | B2* | 11/2003 | Youn et al. | 375/240.12 |
| 6,711,212 | B1* | 3/2004 | Lin | 375/240.24 |
| 6,771,704 | B1* | 8/2004 | Hannah | 375/240.16 |
| 6,842,483 | B1* | 1/2005 | Au et al. | 375/240.16 |
| 6,850,564 | B1* | 2/2005 | Pejhan et al. | 375/240.02 |
| 2002/0012396 | A1* | 1/2002 | Pau et al. | 375/240.16 |
| 2003/0076883 | A1* | 4/2003 | Bottreau et al. | 375/240.12 |
| 2003/0081676 | A1* | 5/2003 | Lin et al. | 375/240.12 |
| 2003/0128766 | A1* | 7/2003 | Tahara et al. | 375/240.26 |
| 2003/0206590 | A1* | 11/2003 | Krishnamachari | 375/240.16 |
| 2004/0190620 | A1* | 9/2004 | Alfonso et al. | 375/240.16 |
| 2004/0223548 | A1* | 11/2004 | Kato et al. | 375/240.16 |
| 2005/0179814 | A1* | 8/2005 | Pau et al. | 348/448 |
| 2005/0229231 | A1* | 10/2005 | Lippincott | 725/131 |
| 2005/0232354 | A1* | 10/2005 | Chen | 375/240.16 |
| 2006/0109900 | A1* | 5/2006 | Shen | 375/240.03 |
| 2006/0198439 | A1* | 9/2006 | Zhu | 375/240.03 |
| 2006/0198445 | A1* | 9/2006 | Li et al. | 375/240.17 |
| 2007/0058718 | A1* | 3/2007 | Shen et al. | 375/240.12 |
| 2009/0016439 | A1* | 1/2009 | Thoreau et al. | 375/240.16 |
| 2009/0168884 | A1* | 7/2009 | Lu et al. | 375/240.16 |

OTHER PUBLICATIONS

Ahmad et al.: Video Transcoding: An Overview of Various Techniques and Research Issues, IEEE Transactions on Multimedia, vol. 7, No. 5, Oct. 2005.*

Cheong et al: "Fast Motion Estimation within the H.264 CODEC", in Proceedings of 2003 IEEE International Conference on Multimedia and Expo (ICME'03), Baltimore, MD, Jul. 2003, pp. III-517 to III-520.

Gallant et al.: "An Efficient Computation-Constrained Block-Based Motion Estimation Algorithm for Low Bit Rate Video Coding", IEEE Transactions on Image Processing, vol. 8, No. 12, Dec. 1999, pp. 1816-1823.

Yin et al.: "Fast Mode Decision and Motion Estimation for JVT/H.264", Proceedings 2003 International Conference on Image Processing, ICIP-2003, Barcelona, Spain, Sep. 14-17, 2003, New York, NY, IEEE, US, vol. 2 of 3, Sep. 14, 2003, pp. 853-856, XP010669968.

Suhring, "Unified Coding Style for the H.26L Reference Software", JVT Reference Software Version JM8.4, http://bs.hhi.de/suehring/tml/download/; Aug. 2006, 5 pages.

Tourapis et al.: "Highly Efficient Predictive Zonal Algorithms for Fast Block-Matching Motion Estimation", IEEE Transactions on Circuits and Systems for Video Technology, vol. 12, No. 10, pp. 934-947, Oct. 2002.

Tourapis, "Enhanced Predictive Zonal Search for Single and Multiple Frame Motion Estimation", in proceedings of Visual Communications and Image Processing 2002 (VCIP-2002), pp. 1069-1079, San Jose, CA, Jan. 2002.

Wiegand et al.: "Draft Errata List with Revision-Marked Corrections for H.264/AVC", Joint Video Team (JVT) of ISO/IEC MPEG & ITU-T VCEG, 9th Meeting, San Diego, CA, Sep. 2-5, 2003, JVT-1050, 254 pages.

Lu et al.: "Fast Mode Decision and Motion Estimation for H.264 with a Focus on MPEG-2/H.264 Transcoding", Circuits and Systems, ISCAS 2005, IEEE International Symposium in Kobe, Japan, May 23-26, 2005, Piscataway, NJ, USA, IEEE, pp. 1246-1249, XP010815936.

International Search Report, dated Sep. 25, 2007.

\* cited by examiner

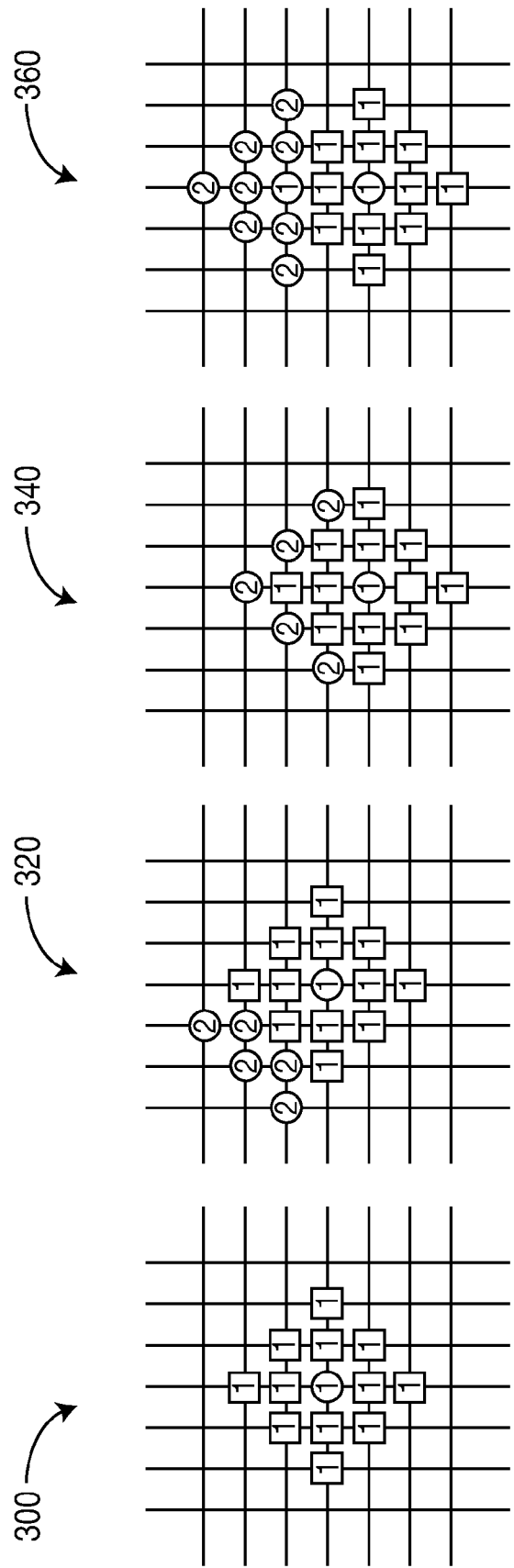

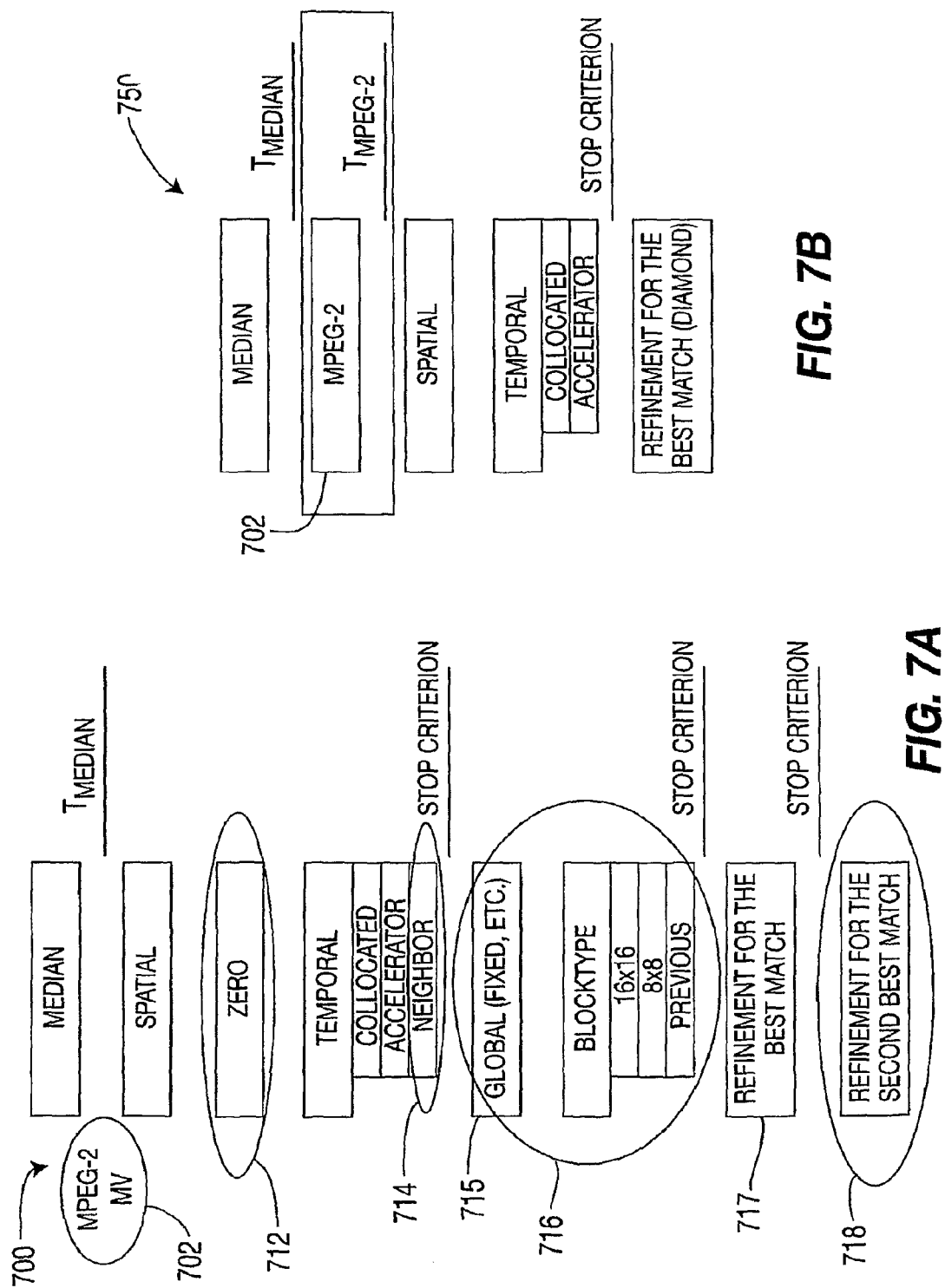

METHOD AND APPARATUS FOR REUSING AVAILABLE MOTION INFORMATION AS A MOTION ESTIMATION PREDICTOR FOR VIDEO ENCODING

CROSS-REFERENCE TO RELATED APPLICATIONS

This application claims the benefit, under 35 U.S.C. §365 of International Application PCT/US2007/002772, filed 1 Feb. 2007, which was published in accordance with PCT Article 21(2) on 29 Nov. 2007, in English and which claims the benefit of U.S. provisional patent application No. 60/765,553 filed 6 Feb. 2006.

TECHNICAL FIELD

The present principles relate generally to video encoding and, more particularly, to a method and apparatus for reusing available motion information as a motion estimation predictor for video encoding.

BACKGROUND

Motion Estimation (ME) is an important part of any video encoding system since it can significantly affect the output quality of an encoded sequence. Unfortunately, this feature requires a significant part of the encoding time especially when using the straightforward Full Search (FS) Algorithm. For this reason, various fast motion estimation algorithms have been proposed which manage to reduce computational complexity considerably with little, if any, loss in coding efficiency compared to the FS Algorithm. A rather popular set of such fast motion estimation algorithms are the predictive algorithms, which initially consider a set of adaptive predictors and thresholds, select the best one (or more) from this set, and refine the selection using predefined search patterns. Such algorithms include the Enhanced Predictive Zonal Search (EPZS), the Predictive Motion Vector Field Adaptive Search Technique (PMVFAST), the Adaptive Predictive Diamond Zonal Search (APDZS), and so forth. Nevertheless, although complexity is reduced considerably using these algorithms, for certain architectures or implementations this may not be sufficient and further reduction in complexity may be desirable.

Block Matching Motion Estimation is an essential part of several video-coding standards such as, for example, the International Organization for Standardization/International Electrotechnical Commission (ISO/IEC) Moving Picture Experts Group-2 standard (hereinafter the "MPEG-2 standard"), the International Telecommunication Union, Telecommunication Sector (ITU-T) H.263 recommendation (hereinafter the "H.263 recommendation"), and the ISO/IEC Moving Picture Experts Group-4 (MPEG-4) Part 10 Advanced Video Coding (AVC) standard/ITU-T H.264 recommendation (hereinafter the "MPEG-4 AVC standard"). By using motion estimation (ME) and motion compensation (MC), we are able to exploit the temporal correlation and reduce the redundancy that exists between frames of video sequences, which leads to high compression efficiency.

In block matching motion estimation, an image is partitioned into indexed regions, in particular square or orthogonal blocks of pixels, and the best match for these blocks is found inside a reference frame. To locate this best match we essentially perform a search inside a previously coded frame and select a best matching block therein using a criterion (whether it is a predetermined criterion or otherwise). The best match is then used to predict the current block, whereas the displacement between the two blocks defines a motion vector (MV), which is associated with the current block. It is only necessary in the encoder to send the motion vector and a residue block, defined as the difference between the current block and the predictor, in order to recover the original block. This can require significantly fewer bits than the direct coding of the original.

The most common distortion measure used is typically the mean absolute error (MAE) or mean absolute difference (MAD), or the equivalent sum of absolute difference (SAD), which requires no multiplication and gives similar performance as the mean square error (MSE). The MAD or SAD of a block A of size M×M located at (x,y) inside the current frame compared to a block B located at a displacement of $(v_x,v_y)$ relative to A in a previous frame is defined as follows:

$$MAD(v_x, v_y) = \frac{1}{M^2} \sum_{m,n=0}^{N-1} |I_t(x+m, y+n) - I_{t-i}(x+v_x+m, y+v_y+n)|, \quad (1)$$

$$SAD(v_x, v_y) = M^2 \cdot MAD(v_x, v_y), \quad (2)$$

where $I_t$ is the current frame and $I_{t-i}$ is a previously coded frame.

If a maximum displacement of W pixels in a frame is allowed, we will have $(2W+1)^2$ locations to search for the best match of the current block. Unfortunately the Full Search (FS) Algorithm, which essentially examines all possible locations to find the block with the minimum distortion, is too computational intensive and cannot be used by various architectures. For example, for a frame of size P×Q and a frame rate of T fps, the amount of computation in terms of operations is as follows:

$$T \cdot \left(\frac{P}{M} \cdot \frac{Q}{M}\right) \cdot (2W+1)^2(2M^2-1) \cong 8TPQW^2 \cong 1.09 \times 10^{10}, \quad (3)$$

for a possible combination of T=30, P=288, Q=360, and W=21, and only if a single reference and block sizes of size 16×16 are considered.

Unfortunately, these numbers become considerably more significant when references for motion estimation and motion compensation.

Predictive motion estimation algorithms have become quite popular in several video coding implementations and standards, such as the H.263 recommendation and the MPEG-2 and MPEG-4 AVC standards, due to their very low encoding complexity and high efficiency compared to the brute force Full Search (FS) Algorithm.

The efficiency in using such predictive motion estimation algorithms comes mainly from initially considering several highly likely predictors and the introduction of early termination criteria. These schemes utilize simple yet efficient checking patterns to further optimize and improve the accuracy of the estimation. For example, the Predictive Motion Vector Field Adaptive Search Technique (PMVFAST) initially examines a 6 predictor set that includes 3 spatially adjacent motion vectors (MVs), the median predictor, (0,0), and the motion vector of the co-located block in the previous frame. The PMVFAST also employs early stopping criteria, which is adaptively calculated and based on correlations between adjacent blocks. These criteria enable the termination of the motion estimation (ME) immediately after these predictors are examined, and if these criteria are satisfied. Otherwise an adaptive two-stage diamond pattern centered on the best predictor is used to refine the search further. This process essentially allows a considerable reduction in the complexity of the ME. Turning to FIGS. 1A-1B, small diamond patterns used in the Enhanced Predictive Zonal Search (EPZS) are indicated generally by the reference numerals 100 and 120, respectively. The numbers 1 and 2 disposed within some of the patterns indicate a first search and a second search, respectively, where the first search finds the minimum cost which is used as a center for the second search.

Diamond patterns were also employed by other similar algorithms, with either fixed step sizes, or in increasing step sizes. In one prior art approach, it is illustrated that the square pattern can be more reliable than the diamond pattern since it can more effectively avoid local minima while, unlike the diamond pattern, can also consider diagonal motion. The introduction of more predictors, leading to the Enhanced Predictive Zonal Search (EPZS), could in the end, yield better quality than PMVFAST, regardless of the pattern (square or diamond) used. Turning to FIGS. 2A-2C, square patterns used in the Enhanced Predictive Zonal Search (EPZS) are indicated generally by the reference numerals 200, 220, and 240, respectively. The numbers 1 and 2 disposed within some of the patterns indicate a first search and a second search, respectively, where the first search finds the minimum cost which is used as a center for the second search.

The EPZS algorithm was further enhanced to further improve performance under a Rate Distortion Optimization (RDO) framework, and to better consider multiple block sizes and references, as used within the MPEG-4 AVC standard. In particular, using H.264 software, Joint Video Team (JVT) Reference Software version JM8.4 (hereinafter referred to as the "JVT Reference Software"), the best motion vector for a given block size is found by minimizing:

$$J(m, \lambda_{MOTION}) = SAD(s, c(m)) + \lambda_{MOTION} \cdot R(m-p) \quad (4)$$

where $m=(m_x,m_y)^T$ is the current motion vector being considered, $p=(p_x,p_y)^T$ is the motion vector used as the prediction during the motion vector coding process, and $\lambda_{MOTION}$ is a Lagrangian multiplier. The rate term R(m−p) represents the motion rate information only and is computed by a table-lookup. The SAD (Sum of Absolute Differences) is computed as follows:

$$SAD(s, c(m)) = \sum_{x=1,y=1}^{B_1,B_2} |s[x, y] - c[x - m_x, y - m_y]|, \quad (5)$$

with s and c being the original and the coded video signals, and $B_1$ and $B_2$ being the vertical and horizontal dimensions of the examined block type and can be equal to 16, 8, or 4. If the search scheme is not good enough, and due to the Lagrangian consideration, the search could easily be trapped at a local minimum, therefore reducing efficiency.

Therefore, for EPZS, improved prediction is achieved through the consideration of more elaborate and reliable search patterns, adaptive dual refinement of the prediction, but most importantly through the consideration of a larger adaptive set of initial predictors, which combined allows for better avoidance of local minima. Such predictors are dependent on distortion, window, block size, reference, and so forth, and could still lead to significant speed improvement without any sacrifice in quality of performance. Unfortunately, this also implies a rather significant overhead increase in terms of checked points compared to previous implementations. Turning to FIGS. 3A-3D, extended patterns used in the extended Enhanced Predictive Zonal Search (extEPZS) are indicated generally by the reference numerals 300 320, 340, and 360, respectively. The numbers 1 and 2 disposed within some of the patterns indicate a first search and a second search, respectively, where the first search finds the minimum cost which is used as a center for the second search.

Turning to FIG. 4, a video encoder without pre-processing elements is indicated generally by the reference numeral 400. The video encoder 400 includes a combiner 410 having an output connected in signal communication with an input of a transformer 415. An output of the transformer 415 is connected in signal communication with an input of a quantizer 420. An output of the quantizer 420 is connected in signal communication with a first input of a variable length coder (VLC) 460 and an input of an inverse quantizer 425. An output of the inverse quantizer 425 is connected in signal communication with an input of an inverse transformer 430. An output of the inverse transformer 430 is connected in signal communication with a first non-inverting input of a combiner 435. An output of the combiner 435 is connected in signal communication with an input of a loop filer 440. An output of the loop filter 440 is connected in signal communication with an input of a frame buffer 445. A first output of the frame buffer 445 is connected in signal communication with a first input of a motion compensator 455. A second output of the frame buffer 445 is connected in signal communication with a first input of a motion estimator 450. A first output of the motion estimator 450 is connected in signal communication with a second input of the variable length coder (VLC) 460. A second output of the motion estimator 450 is connected in signal communication with a second input of the motion compensator 455. A second output of the motion compensator 455 is connected in signal communication with a second non-inverting input of the combiner 435 and with an inverting input of the combiner 410. A non-inverting input of the combiner 410 and a second input of the motion estimator 450 are available as inputs to the encoder 400. An output of the variable length coder (VLC) 460 is available as an output of the encoder 400.

SUMMARY

These and other drawbacks and disadvantages of the prior art are addressed by the present principles, which are directed to a method and apparatus for reusing available motion information as a motion estimation predictor for video encoding.

According to an aspect of the present principles, there is provided an apparatus. The apparatus includes an encoder for encoding an image block by determining a motion estimation predictor for the image block using motion information previously generated from an element other than the encoder, and using the motion estimation predictor in a motion estimation process to generate a motion vector for the image block. The motion estimation predictor is used in place of at least one predictor otherwise used in the motion estimation process. The at least one predictor is any of a search window predictor, a temporal predictor, and a block type predictor.

According to another aspect of the present principles, there is provided a video encoding method. The method includes encoding an image block by determining a motion estimation predictor for the image block using motion information previously generated from an element other than an encoder that performs the encoding step, and using the motion estimation predictor in a motion estimation process to generate a motion vector for the image block. The motion estimation predictor is used in place of at least one predictor otherwise used in the motion estimation process. The at least one predictor is any of a search window predictor, a temporal predictor, and a block type predictor.

According to yet another aspect of the present principles, there is provided an apparatus. The apparatus includes a transcoder for encoding an image block in accordance with a second video coding format. The transcoder reduces a complexity of a motion estimation process used to encode the image block in accordance with the second video coding format by determining a motion estimation predictor for the image block using motion information from a received bitstream corresponding to a first video coding format. The motion estimation predictor is used in place of at least one predictor otherwise used in the motion estimation process. The at least one predictor is any of a search window predictor, a temporal predictor, and a block type predictor.

According to a further aspect of the present principles, there is provided a video transcoding method. The method includes transcoding an image block to encode the image block in accordance with a second video coding format. The transcoding step reduces a complexity of a motion estimation process used to encode the image block in accordance with the second video coding format by determining a motion estimation predictor for the image block using motion information from a received bitstream corresponding to a first video coding format. The motion estimation predictor is used in place of at least one predictor otherwise used in the motion estimation process. The at least one predictor is any of a search window predictor, a temporal predictor, and a block type predictor.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIGS. 3A-3D show diagrams for extended patterns used in the extended Enhanced Predictive Zonal Search (extEPZS) according to the prior art;

FIG. 7A shows a diagram for exemplary original H.264 Enhanced Predictive Zonal Search (EPZS) motion predictors to which the present principles may be applied, in accordance with an embodiment of the present principles;

FIG. 7B shows a diagram for exemplary motion predictors that may be used when MPEG-2 motion vectors are available, in accordance with an embodiment of the present principles.

DETAILED DESCRIPTION

Figure 1A:
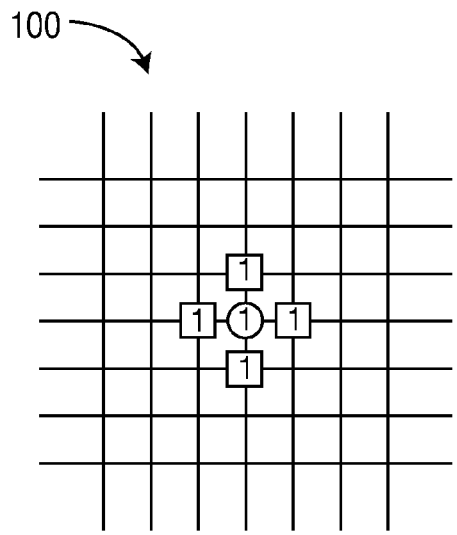
FIGS. 1A-1B show diagrams for small diamond patterns used in the Enhanced Predictive Zonal Search (EPZS) according to the prior art.
Figure 1B:
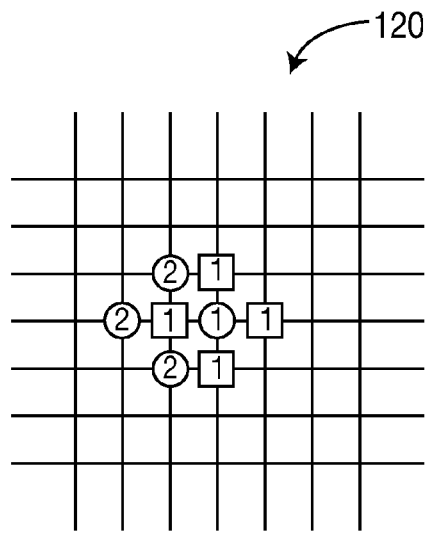

The present principles are directed to a method and apparatus for reusing available motion information as a motion estimation predictor for video encoding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

Figure 5:
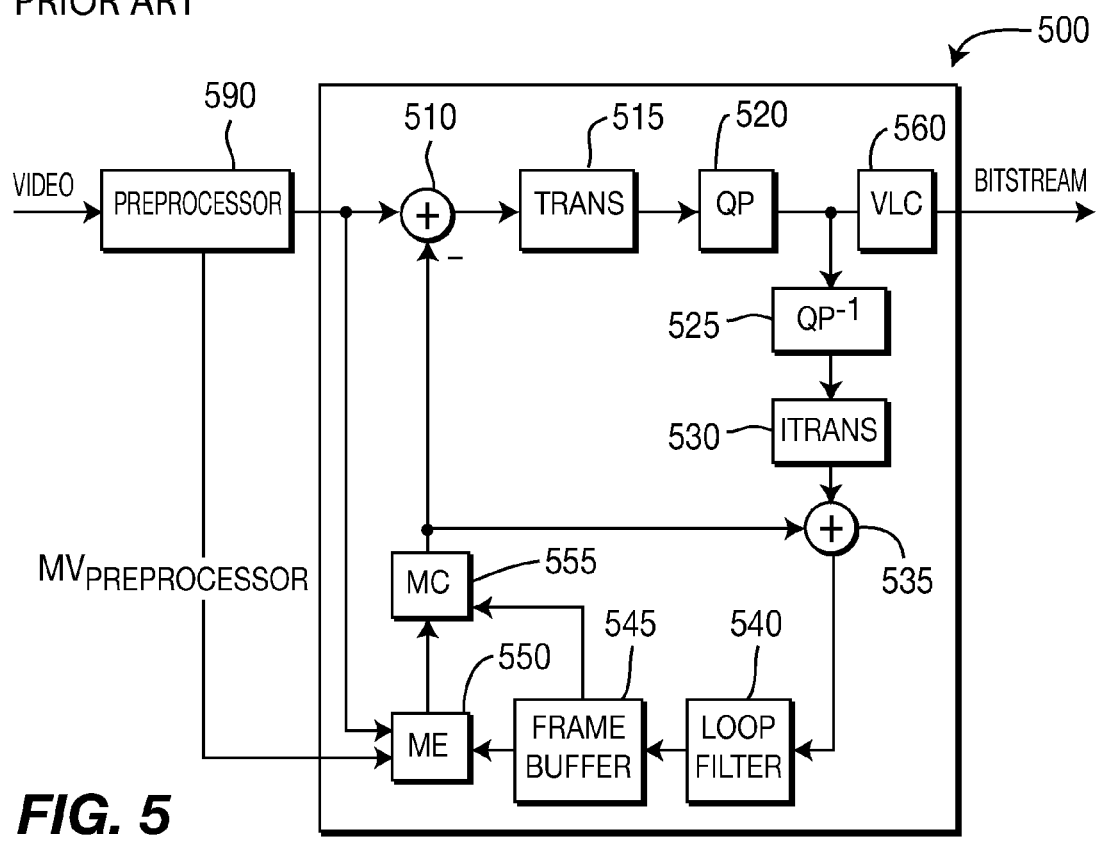
FIG. 5 shows a block diagram for an exemplary video encoder with a pre-processing element, to which the present principles may be applied, in accordance with an embodiment of the present principles.

Turning to FIG. 5, an exemplary video encoder with a pre-processing element are indicated generally by the reference numerals 500 and 590, respectively. The pre-processing element 590 performs its own motion estimation. Motion vectors generated by the pre-processing element 590 may be fed into the motion estimator of the encoder 500.

The video encoder 500 includes a combiner 510 having an output connected in signal communication with an input of a transformer 515. An output of the transformer 515 is connected in signal communication with an input of a quantizer 520. An output of the quantizer is connected in signal communication with a first input of a variable length coder (VLC) 560 and an input of an inverse quantizer 525. An output of the inverse quantizer 525 is connected in signal communication with an input of an inverse transformer 530. An output of the inverse transformer 530 is connected in signal communication with a first non-inverting input of a combiner 535. An output of the combiner 535 is connected in signal communication with an input of a loop filer 540. An output of the loop filter 540 is connected in signal communication with an input of a frame buffer 545. A first output of the frame buffer 545 is connected in signal communication with a first input of a motion compensator 555. A second output of the frame buffer 545 is connected in signal communication with a first input of a motion estimator 550. A first output of the motion estimator 550 is connected in signal communication with a second input of the variable length coder (VLC) 560. A second output of the motion estimator 550 is connected in signal communication with a second input of the motion compensator 555. A second output of the motion compensator is connected in signal communication with a second non-inverting input of the combiner 535 and with an inverting input of the combiner 510. A non-inverting input of the combiner 510, a second input of the motion estimator 550, and a third input of the motion estimator 550 are available as inputs to the encoder 500. An input to the pre-processing element 590 receives input video. A first output of the pre-processor 590 is connected in signal communication with the non-inverting input of the combiner 510 and the second input of the motion estimator 550. A second output of the pre-processor 590 is connected in signal communication with the third input of the motion estimator 550. An output of the variable length coder (VLC) 560 is available as an output of the encoder 500.

Figure 6:
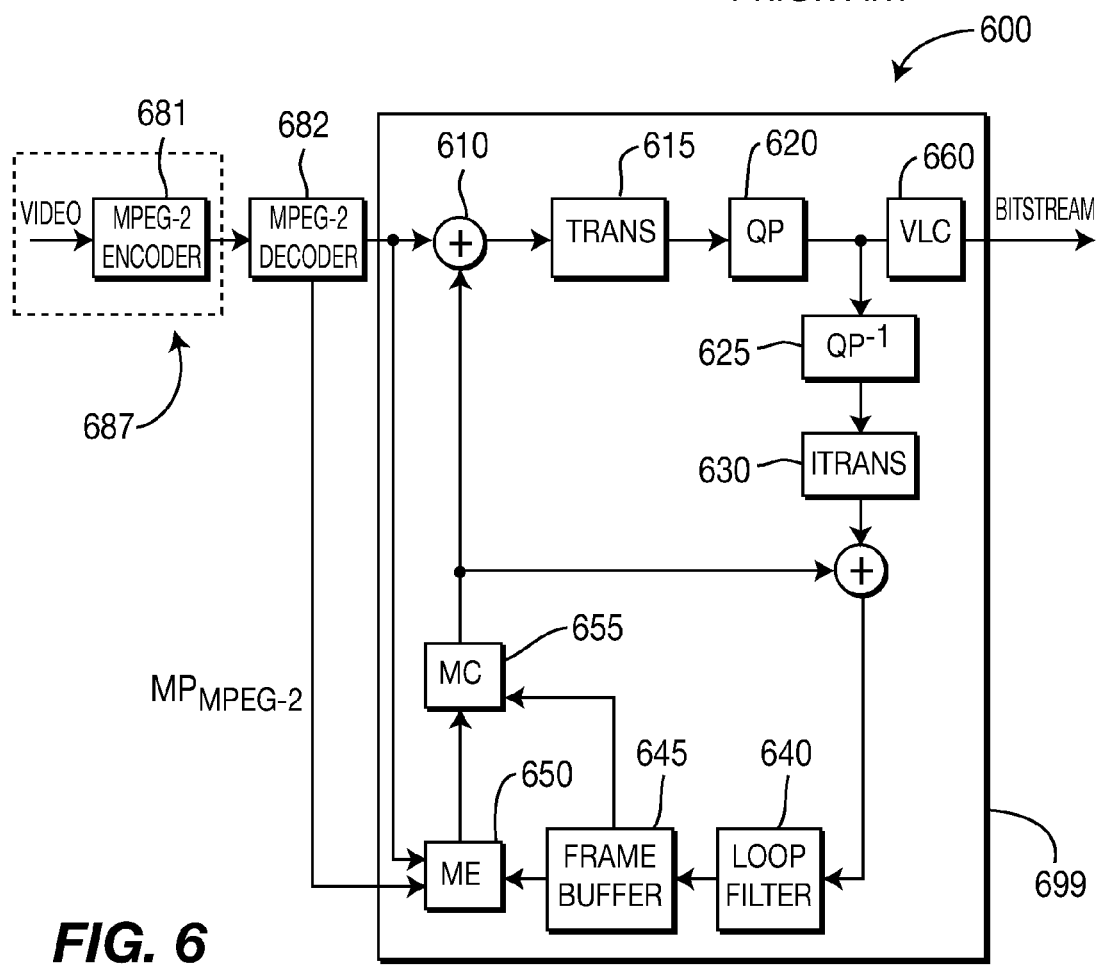
FIG. 6 shows a block diagram for an exemplary video transcoder to which the present principles may be applied, in accordance with an embodiment of the present principles.
Figure 2A:
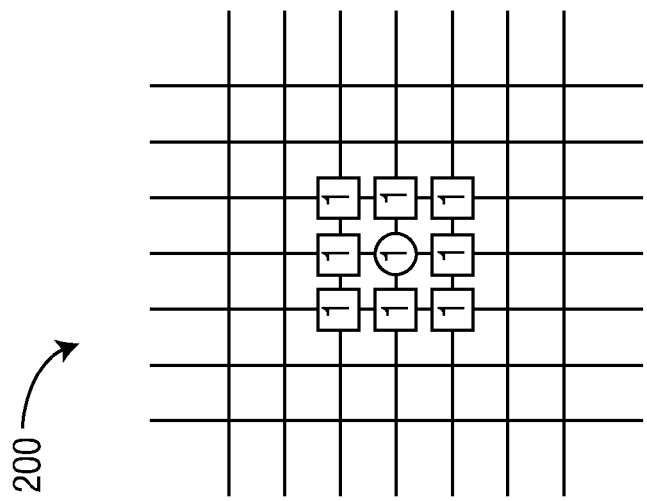
FIGS. 2A-2C show diagrams for square patterns used in the Enhanced Predictive Zonal Search (EPZS) according to the prior art.
Figure 2B:
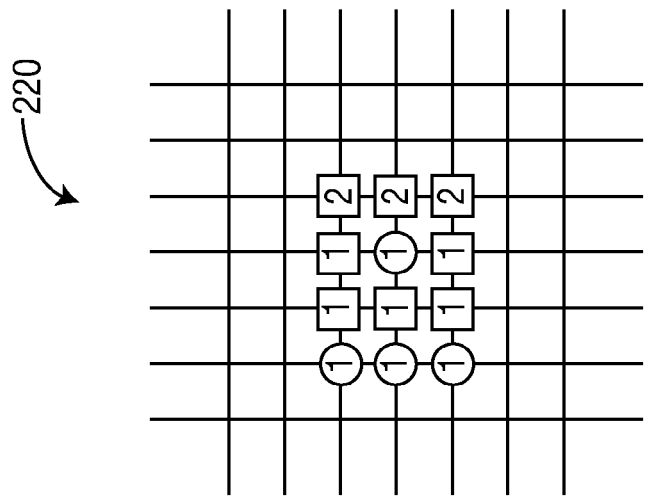
Figure 2C:
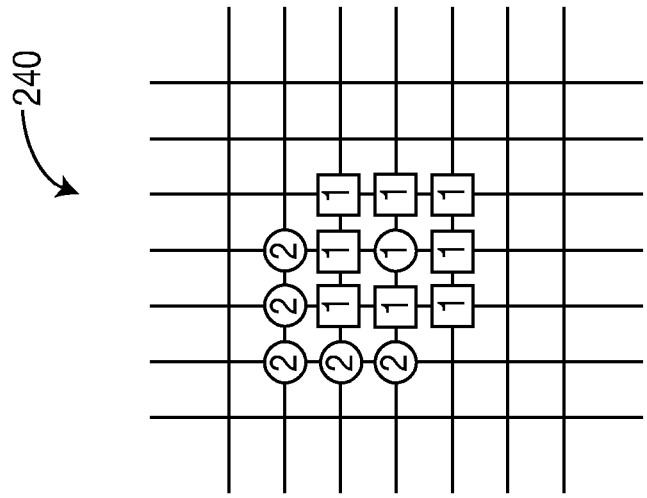
Figure 4:
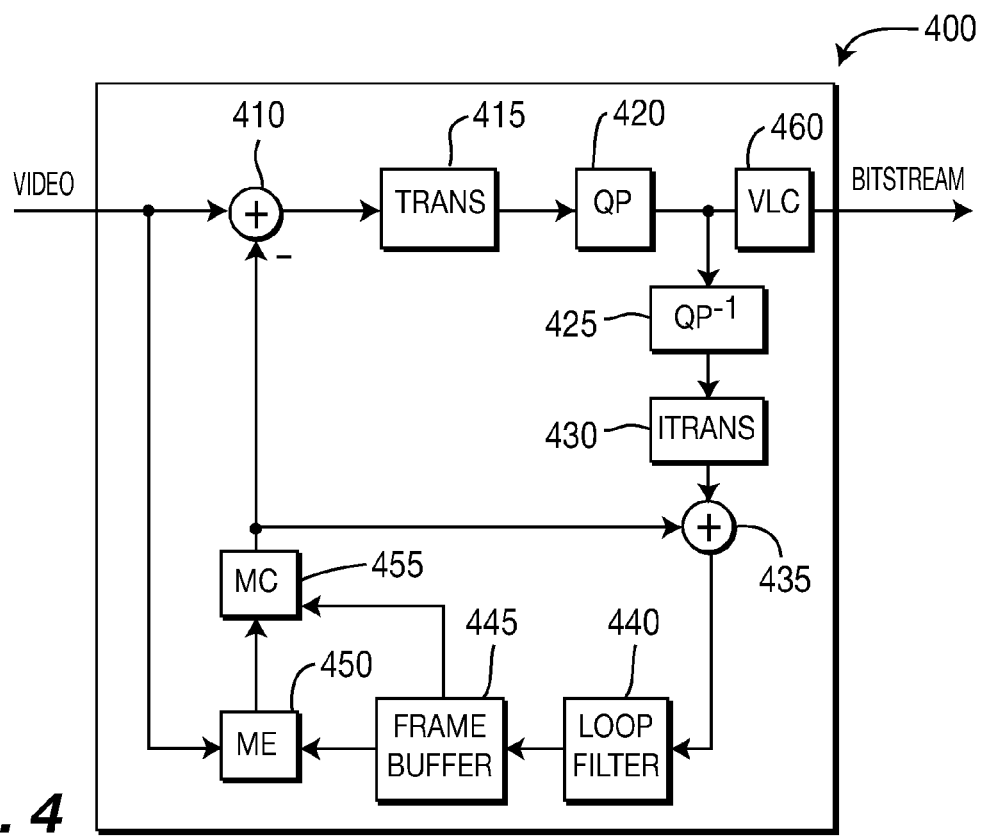
FIG. 4 shows a block diagram for a video encoder without pre-processing elements, according to the prior art.

Turning to FIG. 6, an exemplary video transcoder is indicated generally by the reference numeral 600. The transcoder 600 includes an MPEG-2 decoder 682 and a video encoder 699. Video previously coded into a first format (hereinafter "format A") is transcoded by the transcoder 600 into a second format ("format B"). Here, by way of example, format A is the MPEG-2 standard and format B is the MPEG-4 AVC standard.

Original input video may be input into another entity 687 (an entity not part of the transcoder 600) such as, e.g., an MPEG-2 encoder 681, for coding into format A. Thus, an input to the MPEG-2 encoder 681 receives the original input video, which is then pre-encoded into format A (i.e., MPEG-2). An output of the MPEG-2 encoder 681 is connected in signal communication with an input of the MPEG-2 decoder 682. An input of the MPEG-2 decoder 682 is available as an input of the transcoder 600.

The original input video, pre-encoded by the MPEG-2 encoder 681 into a format A (i.e., MPEG-2), is made available to the MPEG-2 decoder 681. The pre-encoded format A is then decoded by the MPEG-2 decoder 682 and Motion Parameters (MP) from the decoded bitstream are passed from the MPEG-2 decoder 682 to the final encoding motion estimator 650 in the video encoder 699.

The video encoder 699 includes a combiner 610 having an output connected in signal communication with an input of a transformer 615. An output of the transformer 615 is connected in signal communication with an input of a quantizer 620. An output of the quantizer is connected in signal communication with a first input of a variable length coder (VLC) 660 and an input of an inverse quantizer 625. An output of the inverse quantizer 625 is connected in signal communication with an input of an inverse transformer 630. An output of the inverse transformer 630 is connected in signal communication with a first non-inverting input of a combiner 635. An output of the combiner 635 is connected in signal communication with an input of a loop filer 640. An output of the loop filter 640 is connected in signal communication with an input of a frame buffer 645. A first output of the frame buffer 645 is connected in signal communication with a first input of a motion compensator 655. A second output of the frame buffer 645 is connected in signal communication with a first input of a motion estimator 650. A first output of the motion estimator 650 is connected in signal communication with a second input of the variable length coder (VLC) 660. A second output of the motion estimator 650 is connected in signal communication with a second input of the motion compensator 655. A second output of the motion compensator 655 is connected in signal communication with a second non-inverting input of the combiner 635 and with an inverting input of the combiner 610. A non-inverting input of the combiner 610, a second input of the motion estimator 650, and a third input of the motion estimator 650 are available as inputs to the encoder 600. A first output of the MPEG-2 decoder 682 is connected in signal communication with the non-inverting input of the combiner 610 and the second input of the motion estimator 650. A second output of the MPEG-2 decoder 682 is connected in signal communication with the third input of the motion estimator 650. An output of the variable length coder (VLC) 660 is available as an output of the encoder 699/transcoder 600.

As noted above, the present principles are directed to a method and apparatus for reusing available motion information as a motion estimation predictor for video encoding. While existing fast motion estimation algorithms may reduce the complexity of motion estimation, for certain applications, additional complexity reduction may be desirable. The present principles provide this further complexity reduction over the existing fast motion estimation algorithms.

The present principles consider that in many encoder architectures there may exist elements that already perform lower cost pre-processing-level motion estimation (ME), for example, for purposes of rate control, multi-pass encoding, pre-filtering, pre-analysis, and so forth. In accordance with an embodiment of the present principles, the generated motion information in such encoder architectures is used/re-used for a final ME, which allows for further complexity reduction over existing fast motion estimation algorithms. That is, in accordance with an embodiment of the present principles, it is proposed that a video encoder make use of this already available motion information as input into the motion estimation prediction done for the encoder itself, which may provide a significant decrease in the complexity of some encoders for some encoded material.

An embodiment of the present principles may be used as a transcoder, where the reference may have been originally coded in a format A (e.g., MPEG-2), and needs to be transcoded into a different format B (e.g., MPEG-4 AVC). The preceding would be considered an MPEG-2 to MPEG-4 AVC transcoder. In such a transcoder, motion information (such as motion vectors) from the original encoded standard (MPEG-2) may be used to reduce the complexity of selection in the second (transcoded) standard (MPEG-4 AVC). For example, a reference file encoded in an MPEG-2 bitstream is first decoded by the transcoder and then re-encoded in an MPEG-4 AVC format while reusing the motion vectors of the original (MPEG-2) bitstream as hints or prediction aid information within the MPEG-4 AVC encoding process of the transcoder. Of course, the present principles are not limited to solely the preceding standards and, thus, other video encoding standards and recommendations may also be utilized in accordance with the present principles. That is, given the teachings of the present principles provided herein, one of ordinary skill in this and related arts will contemplate these and other video encoding standards and recommendations to which the present principles may be applied, while maintaining the scope of the present principles.

Thus, in an embodiment of the present principles, the motion vectors of the preprocessing level or reference bitstream are reused by considering them as predictors within a predictive based motion estimation scheme. This consideration allows for a considerable reduction in the number of predictor candidates originally employed in such schemes, with little, if any loss, in coding efficiency.

In accordance with an embodiment of the present principles, a method and apparatus are provided that reuse available motion information from the encoder preprocessing elements (see FIG. 5) for performing, for example, rate control, pre-analysis, multi-pass encoding, pre-filtering, and/or so forth. In accordance with another embodiment of the present principles, a method and apparatus are provided for a transcoding architecture (see FIG. 6) for use in the motion estimation process of the final encoder for the transcoder.

In one prior art approach (hereinafter the "above-reference prior art approach"), in an attempt to keep coding efficiency equivalent to that of the Full Search (FS) Algorithm, a rather significant number of predictors was added, while also introducing a more aggressive refinement pattern. The predictors added included the following: search window dependent/global predictors (e.g., fixed or adaptive subsampled search window around center or other predictor); block size predictors; reference based predictors; co-located and surrounding temporal predictors; and accelerator predictors. These predictors were adaptively considered depending on reference, block size, distortion and other potential correlation metrics such as similarity with neighbors. These predictors, and especially the search window dependent predictors, added a rather significant overhead within the prediction process, especially when performing motion estimation for smaller block sizes. Turning to FIG. 7A, exemplary original H.264 Enhanced Predictive Zonal Search (EPZS) motion predictors are indicated generally by the reference numeral 700. The motion predictors 700 include, in addition to those mentioned herein below, a refinement for the best match predictor 717.

However, an embodiment of the present principles allows for the elimination of several of these predictors and a simplification of the refinement process without sacrificing much in terms of quality, by reusing the motion vectors from the preprocessing element or the decoded motion vectors of the transcoding architecture, corresponding to the co-located position (compared to the current block being encoded). Implementations of the present principles depend on the quality of available motion vectors (parameters) and inherently on the quality of the motion estimation used to generate such motion vectors, although it is apparent that these predictor motion vectors may replace the need of search window dependent predictors. Turning to FIG. 7B, exemplary motion predictors that may be used when MPEG-2 motion vectors are available are indicated generally by the reference numeral 750. The MPEG-2 MV predictor 702, absent from the predictors 700 of FIG. 7A, is added to the predictors 750 of FIG. 7B. The zero predictor 712, temporal (neighbor) predictor 714, global predictors or search window dependent predictors 715, block type (16×16, 8×8, previous) predictors 716, and refinement for the second best match predictor 718, included in the predictors 700 of FIG. 7A, are omitted from the predictors 750 of FIG. 7B.

More specifically, by introducing these pre-estimated MV (prMV) parameters within the encoding motion estimation element, one or more of the following considerations may be made with regard to the available predictor set: modify center of search area dependent predictors; reduce the number of (e.g., by constraining the search window) or completely eliminate the search area dependent predictors; remove all adjacent temporal predictors, or retain them according to correlation with prMV or median predictor; do not consider zero predictor when prMV is available and the block type is 16×16; remove or reduce block type dependent predictors (e.g., depending on correlation with prMV); and remove certain predictors when prMV is not available (e.g. in a transcoder system co-located block was intra coded).

Figure 8:
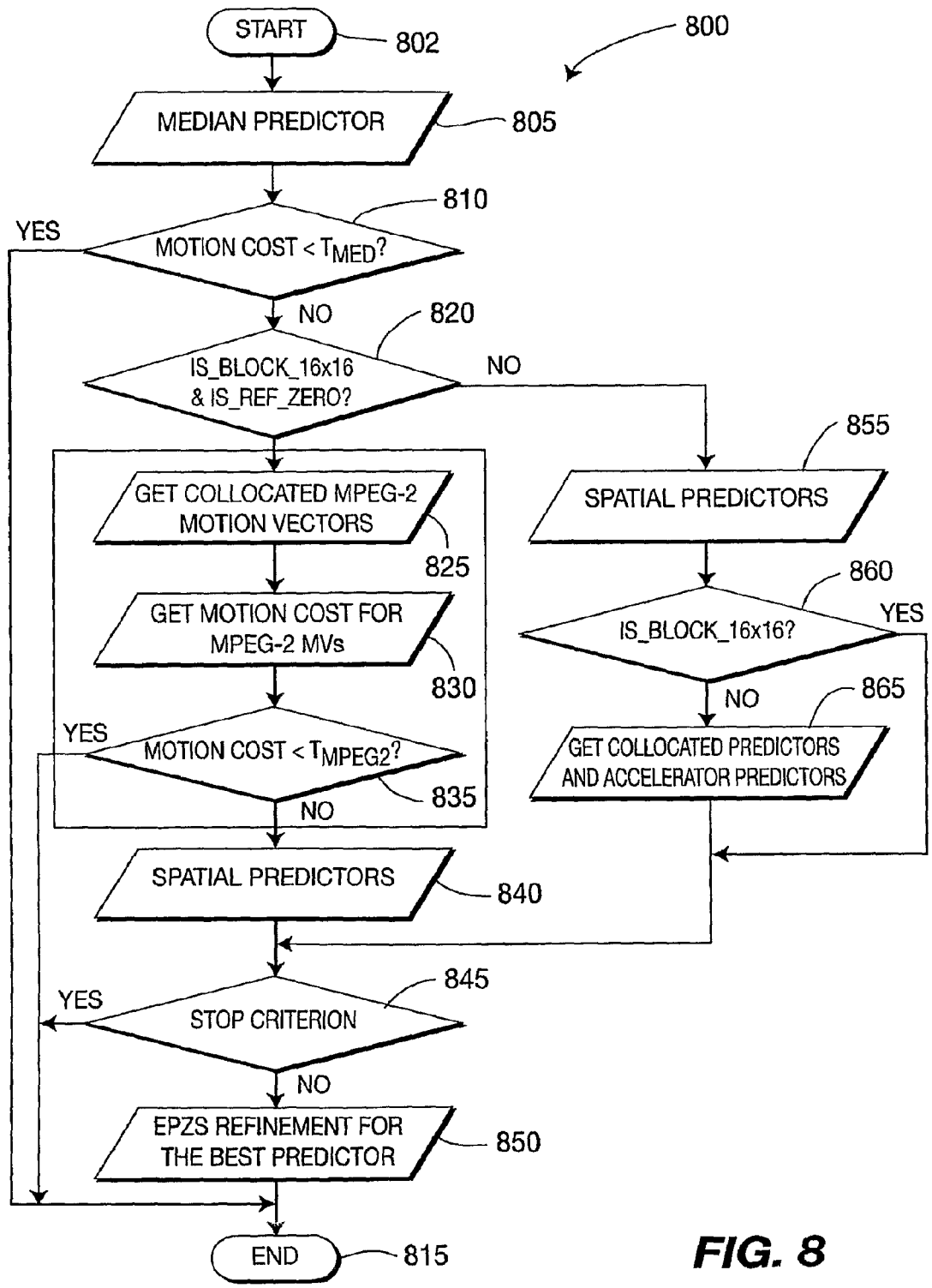
FIG. 8 shows a flow diagram for an exemplary method for performing a motion search in a video encoder or transcoder when MPEG-2 motion vectors are available for use thereby, in accordance with an embodiment of the present principles.

In one embodiment of the present invention, we have elected to completely remove all search area dependent predictors, the block type predictors, and the consideration of the zero predictor for 16×16 block types with zero reference (see FIG. 8). More specifically, the median predictors (i.e., the predictors used for the encoding of the current block type) and prMV motion vectors can be categorized as the most relevant predictors. Thus, the cost of the median predictor is first calculated, and if this cost is smaller then a pre-determined threshold, $T_{median}$, then the motion search terminates. Nevertheless, a similar consideration can be applied to the prMV motion vector. When the cost of prMV is less than a second threshold, $T_{MPEG-2}$, the motion search can again terminate, thereby avoiding any further computations. It is to be appreciated that consideration of prMV motion vectors makes more sense if the corresponding block types (prMV and current) are equivalent, while also the reference is the same. Therefore, if this condition is not satisfied (such as for an MPEG-2 to MPEG-4 AVC transcoder where we need to consider additional block types and references), the prMV is not used. Also, if the prMV is not available (i.e., intra coded partition in the transcoder architecture), then it is omitted or replaced by the zero predictor. Nevertheless, the prMV could still be considered if desired within different block types, or corresponding references. In particular, if the reference picture we are conducting the motion estimation on is different from the reference picture to which prMV is applied, then prMV can be scaled according to the temporal distance of the reference picture we are conducting motion estimation on to the current picture and the temporal distance of the reference picture prMV is applied to the current picture. This property is especially useful when encoding for example bi-predictive (B) slices, or if reordering is used within the MPEG-4 AVC encoder.

For B slices, considering the availability of two sets of predictors, if prMV corresponds to not only a single motion vector but a set of two motion vectors, both motion vectors could be reused (after appropriately scaling these predictors according to temporal distances) to improve efficiency while reducing complexity. Nevertheless, the steps of reducing predictors are similar to those of P (predictive) slices.

A final consideration of our architecture is the simplification of the refinement process. In the above-referenced prior art approach, refinement was performed first by adaptively selecting a refinement pattern, e.g., a diamond, square, or extended diamond, which was applied around the best predictor. If necessary, an additional (one or more) refinement step(s) was performed on secondary predictors depending on their quality. Considering the potentially high reliability of the new predictors, the refinement pattern and the additional refinement steps could be simplified. For example, in FIG. 8, we have selected using only the small diamond pattern for refinement, while completely avoiding the additional refinement. An alternative embodiment may use only the square pattern either for the first or all refinements, or introduce additional constraints or considerations with regards to the pattern used. For example, the distortion or the relationship of prMV with the best predictor MV could be considered to select the pattern or whether the extra refinement would be performed. For example such a condition could be of the form:

If (|prMV−bestMV|<e1)
Terminate search
Else If (|prMV−bestMV|<e2)
Use small diamond pattern
No extra refinement
Else If (|prMV−bestMV|<e3)
Use square pattern
No extra refinement
Else If (|prMV−bestMV|<e4)
Use small diamond pattern
Perform N (or less) additional refinement steps with small diamond pattern
Else
Use square pattern
Perform M (or less) additional refinement steps with small diamond pattern In the above pseudocode, e1, e2, e3, and e4 are appropriately selected thresholds, while N and M correspond to the additional refinement steps (around remaining predictors). Other combinations may also be considered. That is, given the teachings of the present principles provided herein, one of ordinary skill in this and related arts will contemplate these and other patterns for the refinements and these and other criteria for using the refinements, while maintaining the scope of the present invention.

Turning to FIG. 8, an exemplary method for performing a motion search in a video encoder or transcoder when MPEG-2 motion vectors are available for use thereby is indicated generally by the reference numeral 800.

The method 800 includes a start block 802 that passes control to a function block 805. The function block 805 provides a median predictor, and passes control to a decision block 810. The decision block 810 determines whether or not the motion cost is less than a threshold $T_{med}$. If so, then control is passed to an end block 815. Otherwise, control is passed to a decision block 820.

The decision block 820 determines whether or not the current block to be encoded is a 16×16 block and whether or not the current block has the same references. If so, then control is passed to a function block 825. Otherwise, control is passed to a function block 855.

The function block 825 obtains co-located MPEG-2 motion vectors, and passes control to a function block 830. The function block 830 obtains the motion cost for MPEG-2 motion vectors (MVs), and passes control to a decision block 835. The decision block 835 determines whether or not the motion cost is less than a threshold $T_{MPEG2}$. If so, then control is passed to the end block 815. Otherwise, control is passed to a function block 840.

The function block 840 provides spatial predictors, and passes control to a decision block 845. The decision block 845 determines whether pre-specified stop criterion has been met. If so, the control is passed to the end block 815. Otherwise, control is passed to a function block 850.

The function block 850 performs an Enhanced Predictive Zonal Search (EPZS) refinement for the best predictor, and passes control to the end block 815.

The function block 855 provides spatial predictors, and passes control to a decision block 860. The decision block 860 determines whether or not the current block is 16×16. If so, the control is passed to the decision block 845. Otherwise, control is passed to a function block 865.

The function block 865 obtains the co-located predictors and accelerator predictors, and passes control to the decision block 845.

A description will now be given of some of the many attendant advantages/features of the present invention, some of which have been mentioned above. For example, one advantage/feature is an apparatus that includes an encoder for encoding an image block by determining a motion estimation predictor for the image block using motion information previously generated from an element other than the encoder, and using the motion estimation predictor in a motion estimation process to generate a motion vector for the image block. The motion estimation predictor is used in place of at least one predictor otherwise used in the motion estimation process. The at least one predictor is any of a search window predictor, a temporal predictor, and a block type predictor. Another advantage/feature is the apparatus having the encoder as described above, wherein the other element from which the motion information is previously generated is a pre-processing element. Yet another advantage/feature is the apparatus having the encoder as described above, wherein the encoder is configured as a transcoder, and the motion information is derived from a received bitstream to be transcoded. Moreover, another advantage/feature is the apparatus having the encoder as described above, wherein the encoder also uses the motion information to determine a motion vector refinement process. Further, another advantage/feature is the apparatus having the encoder as described above, wherein the encoder applies one or more thresholds to the motion information to terminate the motion estimation process. Also another advantage/feature is the apparatus having the encoder as described above, wherein the encoder scales the motion information according to a temporal distance between a current picture that includes the image block and a reference picture used for the motion estimation process. Additionally, another advantage/feature is the apparatus having the encoder as described above, wherein the encoder generates the motion estimation predictor using the Enhanced Predictive Zonal Search Algorithm. Moreover, another advantage/feature is the apparatus having the encoder that uses the Enhanced Predictive Zonal Search Algorithm as described above, wherein the encoder omits the at least one predictor from the Enhanced Predictive Zonal Search Algorithm.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding an image block by determining a motion estimation predictor for the image block using motion information previously generated from an element other than said encoder, and using the motion estimation predictor in a motion estimation process to generate a motion vector for the image block, wherein the motion estimation predictor is used in place of at least one predictor otherwise used in the motion estimation process, the at least one predictor being any of a search window predictor, a temporal predictor, and a block type predictor,
wherein said encoder scales the motion information according to a temporal distance between a current picture that includes the image block and a reference picture used for the motion estimation process responsive to the reference picture used for the motion estimation process being different from a reference picture used to generate the motion information previously generated from the element other than said encoder.

2. The apparatus of claim 1, wherein the other element from which the motion information is previously generated is a pre-processing element.

3. The apparatus of claim 1, wherein said encoder is configured as a transcoder, and the motion information is derived from a received bitstream to be transcoded.

4. The apparatus of claim 1, wherein said encoder also uses the motion information to determine a motion vector refinement process.

5. The apparatus of claim 1, wherein said encoder applies one or more thresholds to the motion information to terminate the motion estimation process.

6. The apparatus of claim 1, wherein said encoder generates the motion estimation predictor using the Enhanced Predictive Zonal Search Algorithm.

7. The apparatus of claim 6 wherein said encoder omits the at least one predictor from the Enhanced Predictive Zonal Search Algorithm.

8. In a video encoder, a video encoding method, comprising:
encoding an image block by determining a motion estimation predictor for the image block using motion information previously generated from an element other than an encoder that performs said encoding step, and using the motion estimation predictor in a motion estimation process to generate a motion vector for the image block, wherein the motion estimation predictor is used in place of at least one predictor otherwise used in the motion estimation process, the at least one predictor being any of a search window predictor, a temporal predictor, and a block type predictor,
wherein said encoding step scales the motion information according to a temporal distance between a current picture that includes the image block and a reference picture used for the motion estimation process responsive to the reference picture used for the motion estimation process being different from a reference picture used to generate the motion information previously generated from the element other than said encoder.

9. The method of claim 8, wherein the other element from which the motion information is previously generated is a pre-processing element.

10. The method of claim 8, wherein the method is implemented in a transcoder, and the motion information is derived from a received bitstream to be transcoded.

11. The method of claim 8, wherein said encoding step also uses the motion information to determine a motion vector refinement process.

12. The method of claim 8, wherein said encoding step applies one or more thresholds to the motion information to terminate the motion estimation process.

13. The method of claim 8, wherein said encoding step generates the motion estimation predictor using the Enhanced Predictive Zonal Search Algorithm.

14. The method of claim 13, wherein said encoding step omits the at least one predictor from the Enhanced Predictive Zonal Search Algorithm.

15. An apparatus, comprising:
a transcoder for encoding an image block in accordance with a second video coding format,
wherein said transcoder reduces a complexity of a motion estimation process used to encode the image block in accordance with the second video coding format by determining a motion estimation predictor for the image block using motion information from a received bitstream corresponding to a first video coding format, wherein the motion estimation predictor is used in place of at least one predictor otherwise used in the motion estimation process, the at least one predictor being any of a search window predictor, a temporal predictor, and a block type predictor, wherein said transcoder scales the motion information according to a temporal distance between a current picture that includes the image block and a reference picture used for the motion estimation process responsive to the reference picture used for the motion estimation process being different from a reference picture used to s enerate the motion information from the received bitstream corresponding to the first video coding format.

16. The apparatus of claim 15, wherein said transcoder comprises a decoder for decoding the received bitstream corresponding to the first video coding format.

17. The apparatus of claim 15, wherein said transcoder also uses the motion information to determine a motion vector refinement process.

18. The apparatus of claim 15, wherein said transcoder applies one or more thresholds to the motion information to terminate the motion estimation process.

19. The apparatus of claim 15, wherein said transcoder generates the motion estimation predictor for the image block using the Enhanced Predictive Zonal Search Algorithm.

20. The apparatus of claim 19, wherein said transcoder omits the at least one predictor from the Enhanced Predictive Zonal Search Algorithm.

21. The apparatus of claim 15, wherein the first video coding format corresponds to one of a first video coding standard or a first video coding recommendation, and the second video coding format corresponds to one of a second video coding standard or a second video coding recommendation.

22. The apparatus of claim 15, wherein the motion information is previously generated from an element other than said transcoder.

23. In a video transcoder, a video transcoding method, comprising:

transcoding an image block to encode the image block in accordance with a second video coding format, wherein said transcoding step reduces a complexity of a motion estimation process used to encode the image block in accordance with the second video coding format by determining a motion estimation predictor for the image block using motion information from a received bitstream corresponding to a first video coding format, wherein the motion estimation predictor is used in place of at least one predictor otherwise used in the motion estimation process, the at least one predictor being any of a search window predictor, a temporal predictor, and a block type predictor, wherein said transcoding step scales the motion information according to a temporal distance between a current picture that includes the image block and a reference picture used for the motion estimation process responsive to the reference picture used for the motion estimation process being different from a reference picture used to generate the motion information from the received bitstream corresponding to the first video coding format.

24. The method of claim 23, wherein said transcoding step comprises decoding the received bitstream corresponding to the first video coding format.

25. The method of claim 23, wherein said transcoding step also uses the motion information to determine a motion vector refinement process.

26. The method of claim 23, wherein said transcoding step applies one or more thresholds to the motion information to terminate the motion estimation process.

27. The method of claim 23, wherein said transcoding step generates the motion estimation predictor for the image block using the Enhanced Predictive Zonal Search Algorithm.

28. The method of claim 27, wherein said transcoding step omits the at least one predictor from the Enhanced Predictive Zonal Search Algorithm.

29. The method of claim 23, wherein the first video coding format corresponds to one of a first video coding standard or a first video coding recommendation, and the second video coding format corresponds to one of a second video coding standard or a second video coding recommendation.

30. The method of claim 23, wherein the motion information is previously generated from an element other than a transcoder that performs said transcoding step.

* * * * *